United States Patent [19]

Hough et al.

[11] Patent Number: 4,804,878
[45] Date of Patent: Feb. 14, 1989

[54] ELECTRIC LAMP, BASE FOR USE THEREWITH AND METHOD OF ASSEMBLING SAME

[75] Inventors: Harold L. Hough, Beverly; George J. English, Reading; Kirti B. Chakrabarti, Danvers, all of Mass.

[73] Assignee: GTE Products Corporation, Danvers, Mass.

[21] Appl. No.: 11,465

[22] Filed: Feb. 5, 1987

[51] Int. Cl.⁴ .............................. H01J 5/50; H01J 9/00
[52] U.S. Cl. ..................................... 313/113; 313/318; 445/27; 439/613; 439/617
[58] Field of Search ................ 313/318, 113; 439/611, 439/613, 614, 616, 617; 445/27; 362/296, 341

[56] References Cited

U.S. PATENT DOCUMENTS

| | | | |
|---|---|---|---|
| 2,252,476 | 8/1941 | Wright | 313/113 |
| 2,436,259 | 2/1948 | Keiffer | 313/113 |
| 3,852,631 | 12/1974 | Evans | 313/113 X |
| 4,345,178 | 8/1982 | Pappas et al. | 313/113 |
| 4,370,587 | 1/1983 | Notelteirs | 313/113 |
| 4,459,120 | 7/1984 | Tyler et al. | 445/27 X |
| 4,604,680 | 8/1986 | Levin et al. | 313/113 X |

Primary Examiner—David K. Moore
Assistant Examiner—Sandra L. O'Shea
Attorney, Agent, or Firm—Lawrence R. Fraley

[57] ABSTRACT

An electric lamp including a reflector, at least one conductive ferrule located within a surface of the reflector and a lead-in conductor electrically connected to the ferrule and extending within the reflector. The lamp includes a base having an insulative (e.g., ceramic) cap located substantially about the ferrule, barrier means (e.g., ceramic fiber) located within the cap to define an open chamber substantially about the ferrule, an electrical conductor (e.g., wire) extending within the cap and electrically connected (e.g., silver soldered) to the ferrule, and sealing means (e.g., high temperature cement) located within the cap to provide a seal therefore. The barrier means serves to separate the sealing means from the open chamber about the ferrule such that the heat generated by the ferrule can be vented through spaced apertures located within the cap's side wall. A method of assembling a base on an electric lamp is also provided.

32 Claims, 1 Drawing Sheet

ELECTRIC LAMP, BASE FOR USE THEREWITH AND METHOD OF ASSEMBLING SAME

DESCRIPTION

The Government has rights in this invention pursuant to Contract No. 59-8437, awarded by the U.S. Department of Energy.

TECHNICAL FIELD

The invention relates in general to electric lamps and in particular to such lamps wherein an external base is used therewith.

BACKGROUND

Electric lamps and bases of the type mentioned above for use therewith are knwon. Examples include those shown in U.S. Pat. Nos. 2,252,476 (Wright), 2,436,259 (Keiffer), and 4,345,178 (Pappas et al). Although the lamps depicted therein are specifically designed to provide visible radiation, the invention is not so limited, as it is also readily applicable to electric lamps capable of providing infrared radiation. One example of such a lamp is defined in U.S. Pat. No. 4,604,680. In '680, the floodlight (13) is electrically powered and includes a socket (or base) located on an external surface of the floodlight's reflector. This entire assembly is then located within a larger housing (11) designed specifically to conduct heat away and thus prolong the life of the floodlight.

Although the invention to be defined further herein will be described particularly with regard to high temperature electric lamps such as the infrared floodlight in '680, the teachings of this invention are readily applicable to any electric lamp wherein a reflector is used (to direct the radiation from the lamp's internal source) and wherein electrical connections to the internal radiation source are provided through the reflector's wall. Even more specifically, the invention's teachings apply to such lamps wherein at least one external, electrically conductive ferrule (or cup) is securedly positioned (e.g., embedded) within the reflector's external surface and which in turn is electrically coupled to a lead-in conductor (e.g., metallic support wire) which provides a path for electrical current to the contained source (e.g., a sealed tungsten halogen bulb). Such a conductor may be a rigid element for supporting the source or, alternatively, may be non-rigid while the source is oriented in a fixed aligned position by other means (e.g., internal wire structure). By the term ferrule as used herein is meant to include any conductive element sealed within (e.g., embedded) or secured to the rear wall of a lamp reflector and designed for electrically connecting the source within the reflector to an external connection such as contained within the base of the invention. In this regard, it is again worthy of mention that the aforementioned three electric lamps designed for producing visible radiation each include at least one (and usually two) metal ferrules or the like within the reflector to interconnect the contained light source (e.g., a filament in '476) and the externally projecting conductors (e.g., rigid prongs in '259). The conductors in turn are adapted for being coupled to a suitable power source (e.g., 110 VAC) capable of powering the lamp.

As mentioned, the invention is particularly applicable to an electric lamp such as the infrared floodlight defined in the aforementioned U.S. Pat. No. 4,604,680. One characteristic of this lamp is the relatively high amount of heat generated during operation. It is not uncommon, for example, for the temperatures immediately adjacent this lamp to exceed three-hundred degrees Celsius (C). Accordingly, a base used in such a lamp must be able to withstand such temperatures for prolonged periods. Still further, with specific regard to the floodlight in '680, it is essential that accidental exposure to one of the floodlight's external ferrules not occur, as this could create a potential hazard to the operator of the overall assembly containing the floodlight (e.g., during periods of repair and/or floodlight replacement). Such prevention is also highly desirous in other lamps, as electrical shock is always possible during lamp operation whenever live conductive elements are exposed and activity involving the lamp is required.

It is believed, therefore, that an electric lamp including a base capable of preventing accidental shock in a safe and expeditious manner would represent a substantial contribution to the field. It is further believed that such a base, if able to withstand excessive temperatures found about many electric lamps, would constitute an even more substantial contribution. Still further, it is believed that a new method of assembling such a base to an electric lamp of the type defined herein would constitute a significant art advancement.

DISCLOSURE OF THE INVENTION

It is therefore, a primary object of the present invention to enhance the electric lamp field by providing an electric lamp having a base for use therewith which possesses the significant advantageous features cited above.

It is another object of the invention to provide such a lamp and base which can be produced in a relatively inexpensive and facile manner.

It is a further object of the invention to provide a method of assembling such a base on the reflector of an electric lamp of the type described above.

In accordance with one aspect of the invention, there is defined an electric lamp comprising a reflector, a cover secured to the reflector, a light source located within the reflector, at least one ferrule located within an external surface of the reflector, at least one lead-in conductor electrically connected to the ferrule and extending within the reflector to provide a path for electrical current to the light source, and a base including an electrically insulative cap having an opening therein and located on the reflector substantially about the ferrule. The base further includes barrier means located within the cap adjacent the ferrule, this barrier means and the walls of the cap defining an open chamber within the cap substantially about the ferrule. The base also comprises an electrical conductor extending within the opening of the cap and electrically connected to the ferrule. Still further, the base includes sealing means located within the opening of the cap for providing a seal therefor, the described barrier means separating the sealing means from the open chamber about the ferrule.

In accordance with another aspect of the invention, there is defined a base for an electric lamp including a reflector, an electrically conductive ferrule located within a surface of the reflector and an electrically conductive lead-in conductor connected to the ferrule and extending within the reflector. The base comprises an electrically insulative cap having an opening therein and located on the reflector substantially about the ferrule, barrier means located within the cap adjacent the ferrule, the barrier means and the walls of the cap defining an open chamber within the cap substantially about the ferrule, an electrical conductor extending within the cap's opening and electrically connected to the ferrule, and sealing means located within the cap's opening for providing a seal therefor, the barrier means separating the sealing means from the open chamber about the ferrule.

In accordance with yet a further aspect of the invention, there is defined a method of assembling a base on an electric lamp wherein the lamp includes a reflector, an electrically conductive ferrule located within a surface of the reflector and an electrically conductive lead-in conductor connected to the ferrule and extending within the reflector. The method comprises the steps of locating an electrically insulating cap having an opening therein on the reflector and substantially about the ferrule, extending an electrical conductor within the cap through the cap's opening and electrically connecting this electrical conductor to the ferrule, positioning barrier means within the cap through the cap's opening to define with the walls of the cap an open chamber substantially about the ferrule, and locating sealing means within the cap's opening to provide a seal therefor. The barrier means serves to prevent the sealing means from entering the defined open chamber during the aforementioned locating of the sealing means.

BEST MODE FOR CARRYING OUT THE INVENTION

For a better understanding of the present invention together with other and further objects, advantages and capabilities thereof, reference is made to the following disclosure and appended claims in connection with the above-described drawing.

Figure 1:
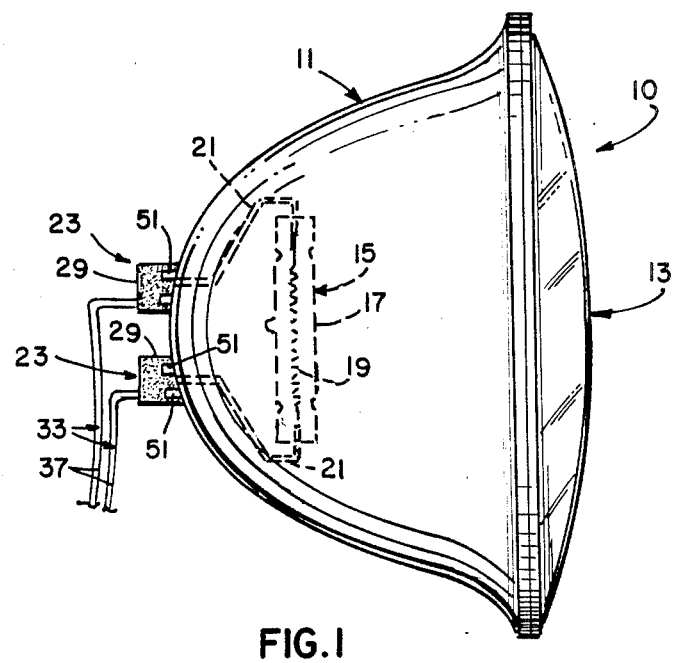
FIG. 1 is a side elevational view of an electric lamp in accordance with a preferred embodiment of the invention.

With particular attention to FIG. 1, there is illustrated an electric lamp 10 in accordance with a preferred embodiment of the invention. Lamp 10 includes a reflector 11 (e.g., of parabolic curvature) to which is secured a cover 13 which, in a preferred embodiment, also functions as a lens to direct the provided radiation from lamp 10 in a predetermined manner. Located within and substantially surrounded by the internal reflecting walls of reflector 11 is a light source 15 (shown hidden) which, in one embodiment, comprised a compact, double-ended tungsten halogen bulb. Bulb 15 includes a quartz glass tubular envelope 17 in which is centrally disposed a coiled-coil tungsten filament 19. A pair of lead-in conductors 21 are sealed within the opposed ends of envelope 17 and extend within the envelope to be electrically connected to the coiled filament. Conductors 21 are preferably of rigid configuration so as to provide adequate support for bulb 15 in the manner indicated. Energization of bulb 15 is accomplished by application of electrical energy (current) through conductors 21, the conductors thus being connected (in a manner to be defined further below) to a suitable external power source (e.g., 110 VAC).

A gas containing a halogen such as bromine, iodine, chlorine or fluoride is sealed within the quartz envelope to provide a halogen regenerative cycle which enable tungsten particles evaporated from the hot filament 19 to combine with the halogen and form the halogen compound which enables the tungsten to be redeposited on the filament. Such operation enables the quartz envelope to remain clean and free of tungsten particles, leading to the vastly longer life provided by lamps of this type. Tungsten halogen lamps are known in the art, with several types presently available on the marketplace. In one example, filament 19 operated at a temperature of about 2950 degrees Kelvin and the lamp possessed a corresponding life of about 4000 hours. The spectral energy distribution of the lamp was similar to that of standard incandescent lamps with only a small percentage (e.g., ten to twelve percent) of the total energy being in the visible spectrum. Approximately seventy percent of the energy was in the infrared spectrum and only about 0.2 percent in the ultraviolet spectrum.

As described, the reflector, lens and internal source (tungsten halogen bulb) of electric lamp 10 are preferably similar to the floodlight (13) described in the aforementioned U.S. Pat. No. 4,604,680, except for the several substantial differences to be defined in detail below. Of significance, the teachings of the instant invention are thus clearly applicable to floodlights capable of providing infrared radiation as well as other lamps which provide visible radiation, such as those cited in the aforementioned U.S. Pat. Nos. 2,252,476, 2,436,259 and 4,345,178.

In accordance with the teachings of the invention, lamp 10 further includes at least one base 23 which is specifically designed for being positioned on the rear of the reflector to provide both an electrical connection between one of the aforedescribed lead-in conductors 21 and the aforedescribed external power source. As shown in FIG. 1, lamp 10 preferably includes two such bases 23, one for each of the separately spaced lead-in conductors 21. In the event that two such bases are utilized, it is preferred that both be identical and thus a description of only one such component will follow. It is also within the scope of the invention to utilize more than two bases per lamp, and thus the teachings of the invention are not meant to be limited to use of only one or two such components.

Figure 2:
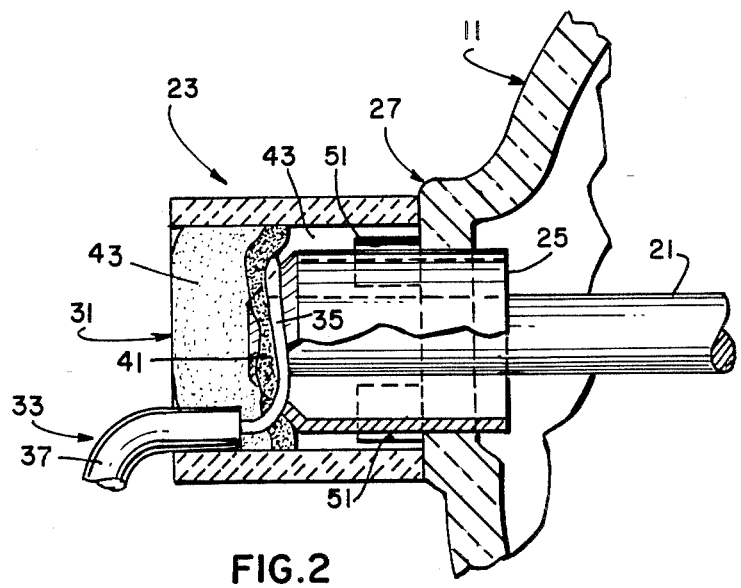
FIG. 2 is a partial side elevational view, in section and on an enlarged scale, of the lamp in FIG. 1, more clearly depicting the base structure for use therewith.

In accordance with the teachings herein, and as shown in much greater detail in FIG. 2, base 23 is specifically designed for being positioned on the rear wall of reflector 11 and substantially about the electrically conductive, metallic ferrule 25 which is positioned (e.g., embedded) within the reflector's rear wall and which projects therefrom. Ferrule 25, as shown, is hollow and is electrically connected (e.g., brazed) to the corresponding lead-in conductor 21 which extends within reflector 11. Ferrule 25 is preferably of a ferrous alloy, but may also be of copper or other suitable metallic material. As also shown in FIG. 2, ferrule 25 is preferably positioned within a boss 27 or similar upstanding portion of the reflector's rear wall.

As will be defined herein, base 23 is specifically designed for use in a high temperature environment to provide the requisite interconnection between the lamp's light source and external power source. Significantly, the base is able to provide electrical isolation of the conductive ferrule without an appreciable rise in ferrule temperature. Understandably, should the ferrule reach excessive temperatures (e.g., about 350 degrees C.), the necessary connections described herein could be adversely effected, in addition to possible damage to the glass material used for reflector 11 (e.g., in the area of the reflector where ferrule 25 is positioned).

As further shown in FIG. 2, base 23 includes a cap 29 of electrically insulative material (e.g. ceramic) which is of cylindrical configuration so as to be positioned substantially about the similarly configured (but smaller diameter) ferrule in the uniformly spaced manner shown. A preferred material for cap 29 is Steatite L-3, available from the Duco Ceramics Company, Saxonburg, Penna. Steatite L-3 is highly desired because of its high heat resistance, being operational up to a temperature of about 1000 degrees C. This material also possesses a volume resistivity at about 300 degrees C. of about $0.6 \times 10^8$ ohm-centimeters (cm) to $800 \times 10^8$ ohm-cm. The dielectric strength of this material is about 145 volts to 280 volts per millimeter. As shown in FIG. 2, cap 29, being hollow, includes an opening or open end 31 therein.

Electrically connected to the conical (tapered) end of ferrule 25 is the exposed, conductive wire of an electrical conductor 33 which, as illustrated, extends within cap 29 through opening 31. Conductor 33, as shown, is preferably a flexible electrical wire having the aforementioned exposed conductive end segment 35 directly connected (e.g., silver-soldered) to ferrule 25. Conductor 33 further preferably includes an insulative portion 37 which projects externally from cap 29. Although conductor 33 is illustrated as being a resilient wire having the described insulation thereon, it is also within the scope of the invention to utilize an electrical conductor of substantially rigid configuration (e.g., a metallic blade contact) which is connected (e.g., soldered) to the ferrule in substantially the same location as conductor 33 and which projects externally from the cap's opening 31. Should such a rigid contact be utilized, connection can then be achieved using a socket or the like (not shown) such as depicted and described in the aforementioned U.S. Pat. No. 4,604,680.

Also positioned within cap 29 is a barrier means 41 which functions to define, with the internal surfaces of the cylindrical walls of cap 29, an open chamber or space 43 about a large portion of the exposed surface area of ferrule 25. Barrier means 41 is preferably a refractory fiber such as a ceramic fiber sold by the Refractory Products Company, Elgin, Ill. as type RPC-X-AR and referred to commonly as wet felt. This fiber comprises approximately 50 percent aluminum oxide and 50 percent silicon dioxide and has a heat resistance capable of withstanding temperatures greater than 1200 degrees C. when in dried form. In assembly, this material is located within the already positioned cap 29 so as to be positioned substantially atop the conductive ferrule 25 as well as a substantial part of the exposed conductive wire 35 connected thereto. This fiber is preferably oriented in such a form for ease of manufacture. The invention is not limited to the use of a ceramic fiber material as described above, however, in that other materials, including fiberglass or ceramic paper could be used as substitutes. Use of the aforedefined ceramic fiber material is preferred, however, to facilitate the described technique for assembling the base defined herein on lamp 10.

In accordance with the teachings herein, base 23 further includes sealing means 45 located within opening 31 of cap 29 and designed for providing a closure or cover therefor, thus sealing the end of the cap and, significantly, the conductor 33 therein. Sealing means 45, in one embodiment of the invention, was comprised of high temperature cement. In one example, Saureisen No. 1 cement available from the Saureisen Cement Company, Pittsburgh, Penna. was utilized. This material possessed a dielectric strength of about 490 volts to about 2000 volts per millimeter and a heat resistance sufficiently high to withstand temperatures approaching 1000 degrees C. The invention is not limited to this particular cement, however, in that other materials possessing similar characteristics could be readily utilized. With sealing means 45 in position as indicated, it is thus seen that barrier means 41 serves to separate the sealing means from the remaining, open chamber portion within cap 29. That is, during assembly of base 23, the defined barrier means serves to prevent the defined cement, being in viscous (flowable) form from entering open chamber 43 to contact and surround ferrule 25. Such contact is prevented by base 23 and represents a significant feature of the instant invention. As defined, sealing means 45 serves to bond the conductive ferrule 25 to the internal walls of cap 29. This can be better seen in FIG. 2 wherein portions of the cement directly contact and bond to the flattened, outermost end of the ferrule. Uniquely, such bonding eliminates the necessity for fixedly securing (e.g., cementing) the insulative cap 29 to the rear surface of reflector 11. Accordingly, the cap merely rests on the reflector's rear surface, preferably in the substantially flush arrangement illustrated in FIG. 2. This is deemed to represent a significant feature of the instant invention in that it enables removal of base 23 without substantial deformation to ferrule 25 or the glass reflector 11. Because conductor 33 is only soldered to the ferrule, removal of base 23 is possible, if desired, by outward exertion on conductor 33 or through utilization of a suitable tool or the like which grips the cap's external surface to perform such removal. With relatively minor exertion, the solder bond is broken and cap removal accomplished, leaving an exposed ferrule 25. Such removal is advantageous should it be desirable, for example, to utilize lamp 10 in another environment. It is understood, however, that some exertion is necessary to accomplish this removal and that base 23 will not become separated from the remainder of lamp 10 (thus breaking the required electrical connection) under normal operation conditions to which the lamp is exposed. It was determined that, in one embodiment of the invention, a force of about ten inch-pounds was necessary to effect base removal. Thus, base 23 is only oriented in an abutting relationship on reflector 11 and not secured thereto during positioning.

As shown in the drawings, each base 23 includes a plurality of apertures 51 therein. The purpose of these apertures is to enable sufficient heat convection from the respective ferrules externally of the base and lamp structure. Additionally, the apertures must be sufficiently small so as to prevent accidental contact with the conductive ferrules during standard testing procedures using electric probes or the like. Each base preferably includes four apertures 51 (only two being shown for illustrative purposes in FIG. 2). The two not shown in FIG. 2 are preferably directly opposite the pair illustrated and thus within the portion of the base which is cut away. These can be seen in FIG. 1. It is within the scope of the invention however to utilize any number (e.g., including only one or, alternatively, more than four) of such apertures per base provided the described adequate venting and accidental contact prevention are achieved.

With particular attention to FIG. 2, the two apertures 51 are shown as being located within the side walls of the cylindrical, electrically insulative cap 29 relative to the defined open chamber 43. Thus, maximum venting is attainable. In one embodiment of the invention (wherein two ferrules were utilized for an infrared lamp), a relatively small ferrule temperature increase was observed using the present invention. Specifically, each ferrule experienced a temperature increase of only about six degrees C. in comparison to a similar lamp wherein the ferrule was exposed and thus not covered by a base or similar member. Such a small increase is deemed very acceptable with no adverse effect on lamp operation.

Thus there has been shown and described an electric lamp wherein the base structure thereof provides several new and unique features. Among these include the ability to provide a sound electrical connection between the lamp's contained light source and the designated external power source, adequate venting of the lamp's conductive ferrule(s), and the prevention of accidental shock through contact with the conductive ferrule(s). The invention as defined herein is of extremely compact design, is relatively inexpensive to produce, and can be assembled in a facile manner.

While there have been shown and described what are at present considered the preferred embodiments of the invention, it will be obvious to those skilled in the art that various changes and modifications may be made therein without departing from the scope of the invention as defined by the appended claims.

What is claimed is:

1. A base for an electric lamp including a reflector, an electrically conductive ferrule located within a surface of said reflector and an electrically conductive lead-in conductor connected to said ferrule and extending within said reflector, said base comprising:
   an electrically insulative cap having an opening therein and located on said reflector substantially about said ferrule;
   barrier means located within said cap adjacent said ferrule, said barrier means and the walls of said cap defining an open chamber within said cap substantially about said ferrule, said walls of said insulative cap including at least one aperture therein relative to said open chamber to enable heat generated by said electrically conductive ferrule to pass therethrough;
   an electrical conductor extending within said opening of said cap and electrically connected to said ferrule; and
   sealing means located within said opening of said cap for providing a seal therefor, said barrier means separating said sealing means from said open chamber about said ferrule.

2. The base according to claim 1 wherein the number of said apertures is four.

3. The base according to claim 1 wherein said base is comprised of ceramic.

4. The base according to claim 1 wherein said barrier means is electrically insulative and is located within said cap substantially about said ferrule and in contact therewith.

5. The base according to claim 4 wherein said barrier means is comprised of fiber material.

6. The base according to claim 5 wherein said fiber material is ceramic fiber.

7. The base according to claim 1 wherein said electrical conductor extending within said cap comprises a conductive wire electrically connected to said ferrule, the portion of said wire not connected to said ferrule including electrical insulation thereon.

8. The base according to claim 7 wherein said conductive wire is soldered to said ferrule.

9. The base according to claim 7 wherein said sealing means also provides a seal for said conductive wire within said cap.

10. The base according to claim 1 wherein said sealing means located within said cap bonds said ferrule to said cap.

11. The base according to claim 10 wherein said cap is not secured to said reflector but merely rests thereon.

12. The base according to claim 11 wherein said reflector includes an upstanding boss portion, said cap resting on said boss portion.

13. The base according to claim 11 wherein said sealing means comprises a high temperature cement.

14. A method of assembling a base on an electric lamp including a reflector, an electrically conductive ferrule located within a surface of said reflector and an electrically conductive lead-in conductor connected to said ferrule and extending within said reflector, said method comprising:
   locating an electrically insulating cap having an opening therein on said reflector and substantially about said ferrule;
   extending an electrical conductor within said cap through said opening and electrically connecting said electrical conductor to said ferrule;
   positioning barrier means within said cap through said opening to define with the walls of said cap an open chamber substantially about said ferrule; and
   locating sealing means within said opening of said cap to provide a seal therefor, said barrier means serving to prevent said sealing means from entering said open chamber during said locating of said sealing means.

15. The method according to claim 14 wherein said cap is oriented in an abutting relationship on said reflector and not secured thereto during said locating thereof.

16. The method according to claim 14 wherein said electrical conductor is electrically connected to said ferrule by soldering.

17. The method according to claim 14 wherein said barrier means is initially positioned within said cap in wet form and thereafter allowed to dry.

18. The method according to claim 13 wherein said sealing means is located within said cap in viscous form and thereafter allowed to dry.

19. An electric lamp comprising:
   a reflector;
   a cover secured to said reflector;
   a light source located within said reflector;
   at least one ferrule located within an external surface of said reflector;
   at least one lead-in conductor electrically connected to said ferrule and extending within said reflector to provide a path for electrical current to said light source;
   a base including an electrically insulative cap having an opening therein and located on said reflector substantially defining an open chamber about said ferrule, an electrical conductor extending within said opening of said cap and electrically connected to said ferrule, sealing means located within said opening of said cap for providing a seal therefor, barrier means separating said sealing means from said open chamber about said ferrule and said walls of said insulative cap including at least one aperture therein relative to said open chamber to enable heat generated by said electrically conductive ferrule to pass therethrough.

20. The lamp according to claim 19 wherein said light source within said reflector is a halogen bulb.

21. The lamp according to claim 20 wherein said lead-in conductor extending within said reflector provides support for said halogen bulb.

22. The lamp according to claim 19 wherein said barrier means is electrically insulative and is located within said cap substantially about said ferrule and in contact therewith.

23. The lamp according to claim 22 wherein said barrier means is comprised of fiber material.

24. The lamp according to claim 19 wherein said electrical conductor extending within said cap comprises a conductive wire electrically connected to said ferrule, the portion of said wire not connected to said ferrule including electrical insulation thereon.

25. The lamp according to claim 24 wherein said sealing means also provides a seal for said conductive wire within said cap.

26. The lamp according to claim 25 wherein said sealing means located within said cap bonds said ferrule to said cap.

27. The lamp according to claim 26 wherein said cap is not secured to said reflector but merely rests thereon.

28. The lamp according to claim 19 wherein said cap is comprised of ceramic, said barrier means is comprised of an electrically insulative fiber, and said sealing means is comprised of cement.

29. A base for an electric lamp including a reflector, an electrically conductive ferrule located within a surface of said reflector and an electrically conductive lead-in conductor connected to said ferrule and extending within said reflector, said base comprising:

an electrically insulative cap having an opening therein and located on said reflector substantially about said ferrule;

barrier means comprised of a fiber material located within said cap adjacent said ferrule, said barrier means and the walls of said cap defining an open chamber within said cap substantially about said ferrule;

an electrical conductor extending within said opening of said cap and electrically connected to said ferrule; and sealing means located within said opening of said cap for providing a seal therefor, said barrier means separating said sealing means from said open chamber about said ferrule.

30. The base according to claim 29 wherein said fiber material is ceramic fiber.

31. An electric lamp comprising:

a reflector;

a cover secured to said reflector;

a light source located within said reflector;

at least one ferrule located within an external surface of said reflector;

at least one lead-in conductor electrically connected to said ferrule and extending within said reflector to provide a path for electrical current to said light source; and a base including an electrically insulative cap having an opening therein and located on said reflector substantially defining an open chamber about said ferrule, an electrical conductor extending within said opening of said cap and electrically connected to said ferrule, sealing means located within said opening of said cap for providing a seal therefor, and a fiber material barrier means separating said sealing means from said open chamber about said ferrule.

32. The lamp according to claim 31 wherein said cap is comprised of ceramic, said fiber material of said barrier means is an electrically insulative fiber, and said sealing means is comprised of cement.

* * * * *